United States Patent Office 3,506,965
Patented Apr. 14, 1970

3,506,965
PROGRAMMING CONTROL SYSTEM
Edward Camp Dowling, Harrisburg, Pa., Mario William Conti, Manhasset, N.Y., and John Breniser Thomas, Camp Hill, Pa., assignors to AMP Incorporated, Harrisburg, Pa.
Filed June 8, 1966, Ser. No. 555,998
Int. Cl. H04q 3/54
U.S. Cl. 340—166
35 Claims

ABSTRACT OF THE DISCLOSURE

The disclosure relates to a control system which provides a plurality of signal source initiating members, such as pushbuttons, divided into Line and Preset groups, with a pair of bistable memory elements under the control of either a Line or a Preset indicating member and in turn controlling a switch module in a switch matrix capable of selectively connecting any one of a plurality of signal sources to an output bus. The memory elements are driven by pulse drivers in turn driven by a master clock, such as the vertical synchronizing source in a video system and are also driven by a circuit which automatically clears all of the memory elements and therefore opens all of the switch modules automatically upon the setting of a selected memory element. Auxiliary drivers are provided for the memory elements which in turn furnish a supply to indicating means in the initiating members with such supply being automatically gated responsive to changes in program. In a form specific to video and audio systems, the foregoing structure is duplicated with respect to each type system and further logic is provided such that either may be utilized without the other and such that both may be utilized under the control of the same initiating members and responded to by the same indicating elements.

---

This invention is directed to a system for controlling the programming of signal sources which are to be selectively transmitted in accordance with a desired sequence. The invention system is particularly adapted to video and/or audio broadcast applications wherein it is used as the principle means located in a broadcast studio through which a variety of different input signals are selected and placed on line, monitored, mixed and otherwise manipulated to effect various broadcast programs.

As programming of signal sources has become more complex, the equipment for controlling or carrying out the various signal switching functions for such programming has also become more complex. This applies to the communication art in general regardless of what type of signals are being programmed and particularly to that part of the communication art related to television and radio broadcast systems. Television programming, and particularly color television programming with its increased required precision of timing of switch action has become so complicated that only highly skilled and experienced operators can be used. Even with such operators the equipment thus far available, being mostly an expanded version of much earlier electromechanical systems, lacks the speed and reliability to permit consistently good control over the successive switching of signal inputs which makes up the programming operation. As an example, many stations which are presently operating have a separate control panel and related equipment for video and audio and sparate operators for each of these sources. The coordination of video and audio is then made to be dependent upon the reactions of and communication between at least two individuals. As a further example, with known systems the control equipment is so constructed that a great deal of the program must be carried mentally by the operator.

As a related and more specific problem with presently used systems, the system components required to effect a transition between sources are relatively large in number. This makes for a general lack of reliability as well as for difficulty in repair and replacement. More importantly, it means that the elements which initiate the control functional required to effect a transition are also many in number, making it necesary for an operator to at times simultaneously, and at times in an exact sequence, manipulate several pushbuttons or rheostats to effect a single change from one signal source to another. Accordingly, it is an object of the present invention to provide a system for controlling the programming of signal sources, which is an improvement with respect to the prior art in terms of providing programming functions through fewer components requiring fewer operations to effect transitions from one source to another.

It is another object of the invention to provide a system for controlling the programming of signal sources which include means to store the events making up a program as well as the signal conditions on line and to automatically indicate to an operator the status of such program with respect to such storage.

It is yet another object to provide a system for controlling the programming of signal sources which assures an improved quality and error-free broadcast programming.

It is a further object of the invention to provide a control system for a video and/or audio type switching matrix, which is simpler in terms of components than heretofore available.

It is yet a further object of the invention to provide a control system for programming video and/or audio type signals which includes magnetic core storage capable of nondestructive readout for indication of line and preset data, as well as for accomplishing the logic required for program changes.

It is still a further object of the invention to provide a control system for programming wherein the Line and Preset program are under the control of a magnetic core capable of retaining a given program in the event of power failure.

The invention control system achieves the foregoing objective by providing a plurality of signal source initiating members, such as pushbuttons, divided into Line and Preset groups, with a pair of bistable memory elements under the control of either a Line or a Preset indicating member and in turn controlling a switch module in a switch matrix capable of selectively connecting any one of a plurality of signal sources to an output bus. The memory elements are driven by pulse drivers in turn driven by a master clock, such as the vertical synchronizing source in a video system and are also driven by a circuit which automatically clears all of the memory elements and therefore opens all of the switch modules automatically upon the setting of a selected memory element. Auxiliary drivers are provided for the memory elements which in turn furnish a supply to indicating means in the initiating members with such supply being automatically gated responsive to changes in program. In a form specific to video and audio systems the foregoing structure is duplicated with respect to each type system and further logic is provided such that either may be utilized without the other and such that both may be utilized under the control of the same initiating members and responded to by the same indicating elements.

In the description to be hereinafter given the system of the invention will be described relative to video and/ or audio signal sources and certain of the functions to be mentioned will be presented in a form somewhat specifically directed to the requirements of such systems. It is to be understood, however, that the system of the invention is contemplated as being used in a variety of communication applications wherein there is need to selectively program a number of signal sources for transmission.

GENERAL DESCRIPTION OF SYSTEM COMPONENTS

Figure 1:
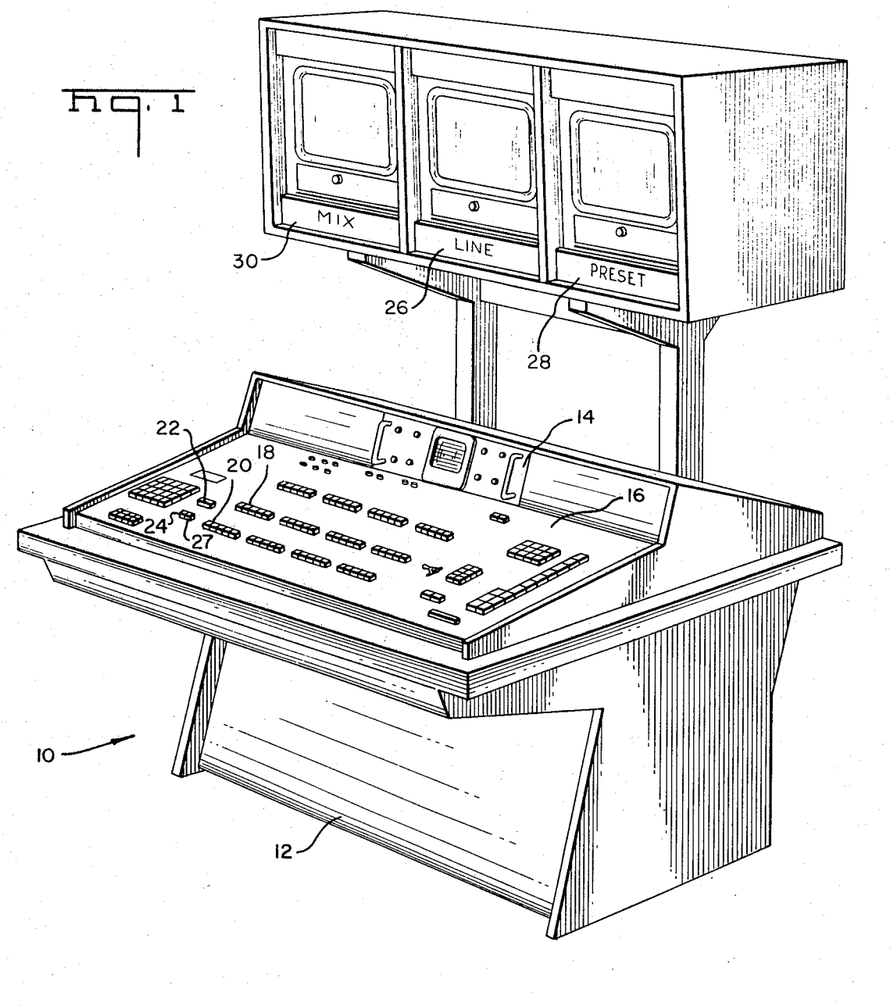
FIGURE 1 is a perspective showing the general arrangement of equipment for a control system for programming audio and video signal sources.

In FIGURE 1 there is shown a console 10 of the type which may be found in a television studio. The console includes a base 12 having mounted thereon a signal analyzing monitor 14 and a control panel 16 with various control initiating members such as pushbuttons arranged for ease of access by an operator seated in front of the console. The various initiating members in accordance with the invention are pushbuttons or rheostat arms which, when operated, serve to initiate a programming function. In accordance with the present invention the pertinent initiating members include a row of pushbuttons such as 18, which are assigned Line functions, and a row of pushbuttons such as 20, which are assigned Preset functions; a Take button or bar 22 and Video-Only and Audio-Only pushbuttons 24 and 27. In accordance with the invention each of the Line and Preset rows of pushbuttons is associated with a pair of video signal sources and a pair of audio signal sources and with a control circuit and structure for executing program changes and selection. Further, in accordance with the invention, the individual pushbuttons for Line and Preset are made to share sources and each pushbutton includes a pair of indicating elements such as lamps, preferably positioned under the face of the pushbutton in conjunction with a legend relating to a particular audio and to a particular video signal source. As shown in FIGURE 1, the Line row of twenty-five pushbuttons may control twenty-five distinct audio and twenty-five distinct video signal sources, and by means to be described in detail hereinafter, the same Line row may be made to also control the twenty-five video and audio signal sources for the Preset row. The Preset row of pushbuttons is similarly made to control video and audio signal sources. The pushbuttons 24 and 27 are related to the control system in a manner whereby depression of neither permits depression of a single Line or Preset pushbutton to control both audio and video signal sources and where depression of one or the other permits a depression of either Line or Preset pushbuttons to control one or the other of audio and video signal sources. The Take bar 22 is related to the control circuit such that its depression effects a transition between Line and Preset signal sources previously selected by depression of one of the Line or Preset pushbuttons.

Affixed to the base of the console 12 and positioned thereabove for use by the operator of the console are monitor video sets 26, 28 and 30. The set 26 is for Line and permits the operator to observe at all times what is then on Line or on the air during a given program. The set 28 is for Preset and permits the operator to observe the video signal source, which is next to appear as an event following the Line event. The set 30 is for a "mix" of the Line and Preset signal sources.

Figure 2:
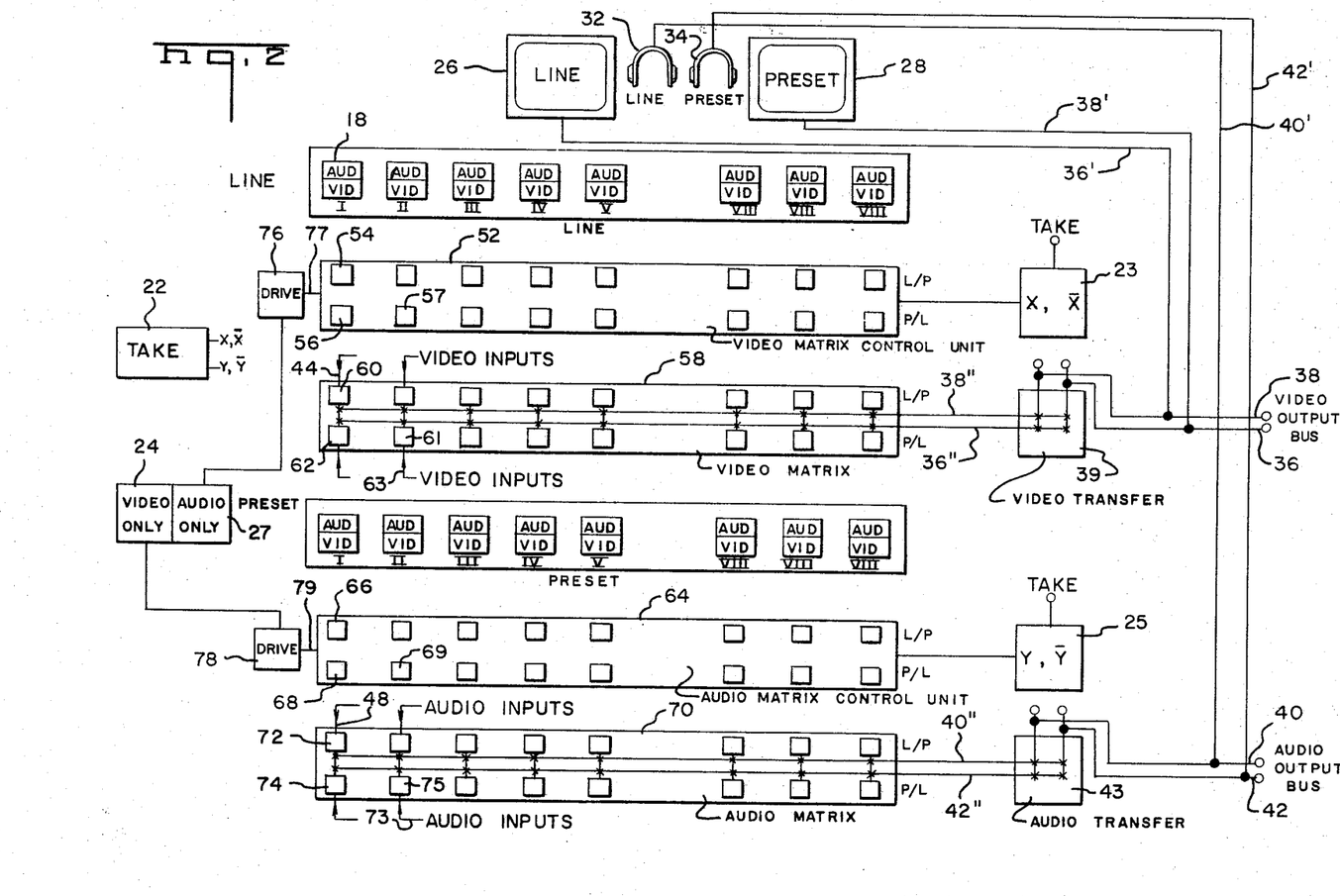
FIGURE 2 is a schematic diagram showing the relationship between program initiating members, memory elements, switch modules and the circuit which initiates changes in programmings for both audio and video signal sources.

Reference is now made to FIGURE 2 which reproduces the various elements just discussed, as well as schematically showing the elements controlled thereby. These elements are arranged in rows termed L/P and P/L to indicate that the Line and Preset control functions are capable of being reversed in the different rows, relative to L/P and P/L function. The number of signal sources has been abbreviated to include only eight sets of initiating and control elements with the components associated therewith to control only 8 signal sources for each L/P and P/L row. In addition there are shown audio monitors represented as earphone sets 32 and 34 for Line and Preset audio sources.

Leading from the elements under control of the console are the main buses for video and audio output. The bus labeled 38 is for Line video and the bus labeled 36 is for Present video. The buses 40 and 42 are for Line and Preset audio. These Line buses carry the selected signals from source inputs through the console circuit out to transmission equipment and the Preset buses carry the Preset signals to matched loads or other monitoring equipment. The monitors 26, 28, 32 and 34 are supplied by the numbered leads (shown primed) tapped onto the output buses at a point wherein the signals carried are exactly what is being fed to the transmission equipment.

In accordance with the invention, each of the output buses for video and for audio is routed through a 2 x 2 transfer switch, such as 39 for video and 43 for audio, each capable of switching the signals on one bus to the other bus. Switching control is derived for the video transfer switch from a relay or logic element 23 in turn controlled by the Take bar 22. The audio transfer switch is similarly controlled by a relay or other logic element also controlled by the Take bar 22. The direct control of the Take bar over these relays is used here for simplicity, it being understood that in practice the Take bay may actually supply some other logic circuit which develops signals to indirectly control the relays. The relays 23 and 25 are assigned to logical symbols X, $\overline{X}$ and Y, $\overline{Y}$, which represent the positions and states of operation. When the relays are in the X and Y positions the inputs to the transfer switches on leads 38" and 40" are produced as outputs on buses 38 and 40. The inputs from leads 36" and 42" to the transfer switches are therefore supplied to the output buses 36 and 42. When the relays are in $\overline{X}$ and $\overline{Y}$ positions, the signals on the leads are switched so as to be reversed on the output buses. Switches 39 and 43 may be of a construction known in the industry, but preferably are constructed in accordance with the teachings in copending U.S. application Ser. No. 537,527, filed Mar. 25, 1966, in the name of Carlisle et al. From the foregoing it should be apparent that all transitions between Line and Preset sources are accomplished in the relatively simple 2 x 2 switches 39 and 43, rather than in the larger video and audio matrix switches which are directly connected to the various signal sources. In this way the quality of the switches 39 and 43 may be very substantially up-graded without materially affecting the cost of the overall system. Additionally, the reliability of the system is by this technique materially improved.

The video and audio buses are each supplied by a matrix of switch modules such as 58 for video and 70 for audio, having pairs of distinct signal source inputs arranged in columns associated with the pushbuttons for Line and Preset and arranged in rows associated with one or the other two buses shown for video and audio. These switch modules and the matrix iself are preferably of the construction taught in the Carlisle et al. application above mentioned. In accordance with the invention, each switch module in a matrix is associated with an individual memory element located in a matrix control unit. The video matrix control unit 52 thus includes rows and columns of memory elements exactly paralleling in function and control, the individual switch modules of the video matrix. An audio matrix control unit 64 is similarly constructed and organized with respect to the to audio matrix 70.

Further, in accordance with the invention, each pair of memory elements for audio and video in a given column are made to be controlled by either of the pushbuttons associated with such column. This control includes the memory element of the video matrix control unit as well as those of the audio matrix control unit. Looking to the lefthand column of FIGURE 2 and to the pushbutton labeled Audio I-Video I in Line and Preset rows, aligned therewith for ease of explanation are video memory elements 54 and 56 in the unit 52 and memory elements 66 and 68 in unit 64. We also find in such column switching modules in unit 58 numbered 60 and 62 and switching modules numbered 72 and 74 in the audio unit 70. The circuit of the invention is so arranged that depression of the Line button associated with the lefthanded column can be made to control either 54 or 56 and either 72 or 74. Similarly, the Preset button associated with the lefthanded column can control any of these four memory elements. The switching modules 60, 62, 72 and 74 are individually associated with a single memory element, but since either of the memory elements in a given column, for both video and audio, can be controlled by a single pushbutton, the flexibility of programming is expanded to permit the operation of a single pushbutton to control as many as four different signal sources. This is dependent upon which logical state, X or $\bar{X}$, Y or $\bar{Y}$, the video and audio matrices happen to be in at the time the button is depressed. Each of the individual memory elements 54, 56, 66, 68 is identical and is generally some bistable state device, which may be set or cleared or in binary terms, driven to be in either a one or a zero binary state. Additionally, each of the memory elements is made to provide an output operating its associated switch module to its closed position to connect the associated video or audio input to the appropriate bus. When cleared or driven to a zero state each memory element operates to cause an associated switch module to open its contacts and remove the associated signal source from the related output bus. Each memory element is further made to provide an indication of its set state in the form of a signal voltage with a lack of voltage representing its cleared state. The signal voltage is made to operate a lamp associated with the pushbutton in the column common to such element, subject to the direction of X, $\bar{X}$ or Y and $\bar{Y}$ determining the specific row. A variety of relay, transistor, and vacuum tube memory elements are capable of providing these functions. A preferred memory element is, however, a multiaperture magnetic core. This will be described hereinafter relative to a specific embodiment of the circuit.

Setting of selected memory elements is accomplished by a drive common to all memory elements of a given matrix control unit. Thus for the video matrix control unit 52 there is a drive supply 76 and for unit 64 there is a drive supply 78. These supplies are fed by leads 77 and 79 to each of the memory elements of the related matrix control. The drives 76 and 78 are in turn supplied by some clock source such as the vertical synchronizing pulse source of a video system. Each of the separate drives is also controlled by pushbuttons 24 and 27, which serve to open the supplies to the matrix control units, thus making the depression of a given pushbutton control produce a connection of only video or only audio. As one additional feature, the circuit in each of the units 52 and 64 is arranged such that depending upon the logical condition X or $\bar{X}$, Y or $\bar{Y}$, depression of either Line or Preset pushbuttons may be made to control and set either one of the pairs of memory elements associated with the video and audio controls. Simultaneously, all of the memory elements in the same row with the element being set are caused to be cleared and the memory elements in the row containing memory elements which are not set are left undisturbed. As yet a further point to be made more clear in the detailed description hereinafter to follow, each of the pushbuttons is made to have a pair of lamps, one for the audio function and one for the video function. These lamps are controlled by the memory elements for the column associated with the pushbutton. Thus, with respect to the lefthanded pushbutton in FIGURE 2, the upper portion thereof containing the legend Audio I is supplied with a lamp which, when caused to be lighted by a signal voltage, indicates that the associated switch memory module 66 or 68 are set and that the switch module 72 or 74 are energized and closed. Each pushbutton contains a lower legend relating to the video signal and these legends are adapted to be illuminated by bulbs associated therewith to signify that the memory elements such as 54 or 56 are set and that the associated switch modules such as 60 or 62 are energized and closed. A further logic control is provided for the lamp from the relays 23 and 25, in a manner to be explained, which operates to cause the lighted condition of a lamp to switch from L/P to P/L and from P/L to L/P, depending upon which of the logical states, X or $\bar{X}$, Y or $\bar{Y}$ happens to have been effected by a previous operation of the Take bar.

GENERAL DESCRIPTION OF SYSTEM FUNCTION

Figure 3:
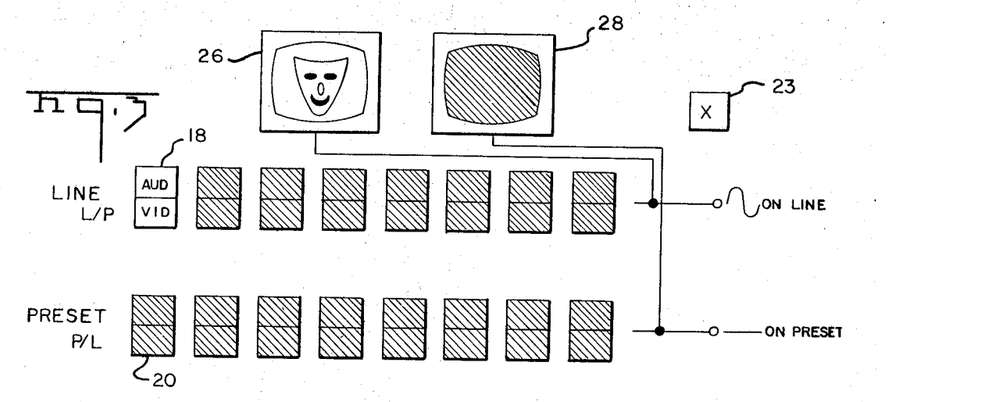
FIGURES 3-8 are diagrams showing the operation of indicating means in different programming steps during operation of the system of the invention.

Before going into a further and more detailed explanation of the circuit which achieves the foregoing functions several exemplary transitions will be outlined relative to FIGURES 3–8 to indicate two programming is effected. Assume that both audio and video signal sources are being utilized simultaneously, and assume further that an L/P signal source is on the air, being monitored through the video monitor receiver 26 and through the audio monitor receiver 32. Further, assume that such control has been effected by depression of the left-handed pushbutton of the Line row, Audio I-Video I, which has caused the memory element 54 and the memory element 66 to be set, in turn causing the switch modules 60 of the video matrix and 72 of the audio matrix to be closed, thereby connecting the sources from leads 44 and 48 to the lead 38″ and 40″, respectively. The logical condition of the relays 23 and 25 are in the X and Y states, such that these signal sources are output to the video buses 38 and 40. At this time, in accordance with the invention, the lamps associated with the Audio I-Video I pushbutton in the Line row will be lighted to illuminate the button legends. This is shown in FIGURE 3 relative to both audio and video selection of pushbuttons and as to video in the monitors, the audio being left out for clarity.

Figure 4:
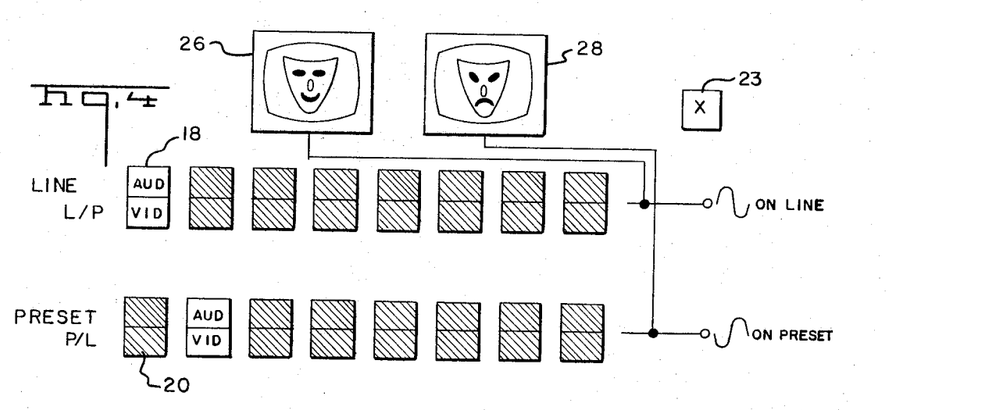

Next assume that the event to follow what is then set up on Line is comprised of the audio and video signal sources associated with the column of pushbuttons legened Audio II-Video II. Since this will then constitute a Preset event, the button legened Audio II-Video II in the Preset row will be drepressed. When this occurs the memory elements 57 and 69 will be set to cause the switch modules 61 and 75 to be closed, thereby placing the input from leads 63 and 73 on the lower leads 36″ and 42″. Since the relays 23 and 25 are then in the logical X position, this will connect the P/L input signal sources to the output buses 36 and 42 to supply the Preset monitors 28 and 34. The two lamps associated with the Preset pushbutton legends Audio II and Video II will both be lighted to indicate the presence of signals in this column in the Preset row. This is shown in FIGURE 4.

Figure 5:
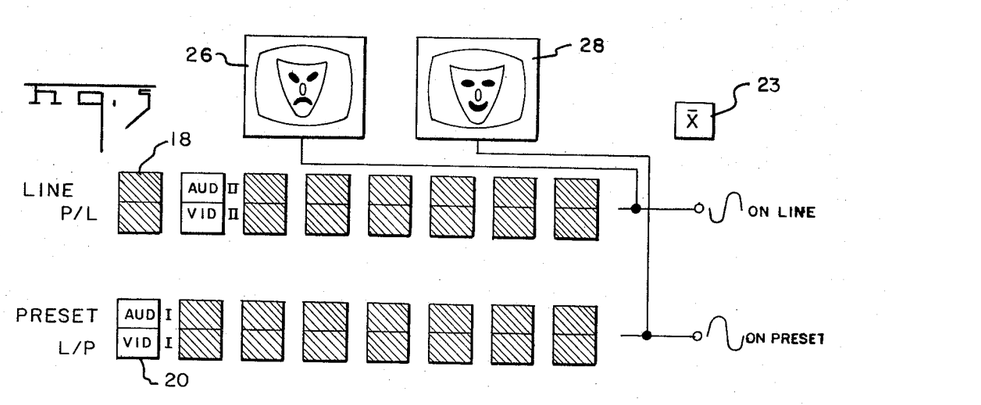

Now assume that it is desired to switch the signal sources on L/P onto the P/L channel and to switch the signal sources on P/L onto the L/P channel. This transition may be based upon cue, or upon studio or real time, or by a number of other means. To effect this transition the operator merely depresses momentarily the Take bar 22. This switches the logical state of the relays 23 and 25 to the $\overline{X}$ and $\overline{Y}$ conditions, which effects a switching of the signal leads 36″, 38″ and 40″, 42″ in the transfer switches 39 and 43, to in turn switch the output on the video and audio buses. Simultaneously, the signal sources which formerly were presented in the Preset monitors 28 and 34 are presented on Line and in the monitors 26 and 32, and the signals formerly on Line are presented in the Preset monitor 28 and 34. As will be explained hereinafter, the circuit of the invention also operates to extinguish the lamps associated with the pushbutton in the Line row legend Audio I-Video I and cause the pushbutton legend Audio I-Video I in the Preset row to be illuminated. The legends associated with the pushbutton Audio II-Video II in the Preset row are extinguished and the legends Audio II-Video II associated with pushbutton in the same column are illuminated in the Line row. This is shown in FIGURE 5. It is to be noted that no matrix memory elements or actual matrix switches have been exchanged or modified from prior status. The operator then knows exactly which of the signal sources on Line (being broadcast) and Preset are energized. It is to be noted that all of the foregoing has occurred automatically responsive to a single depression of the Take bar.

Figure 6:
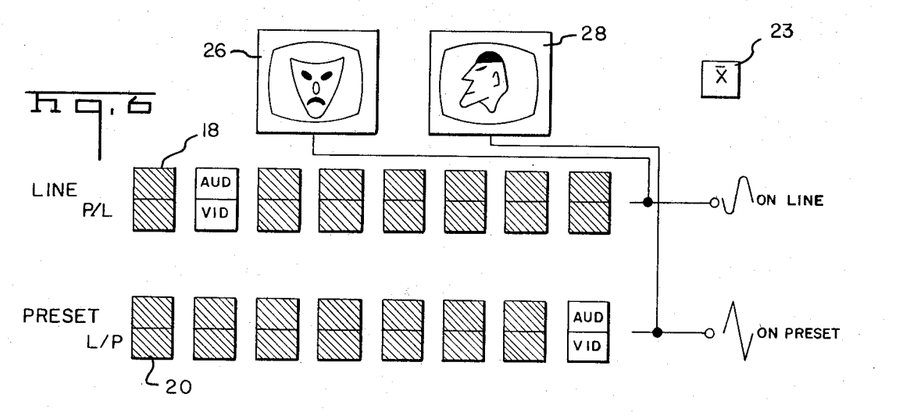
Figure 7:
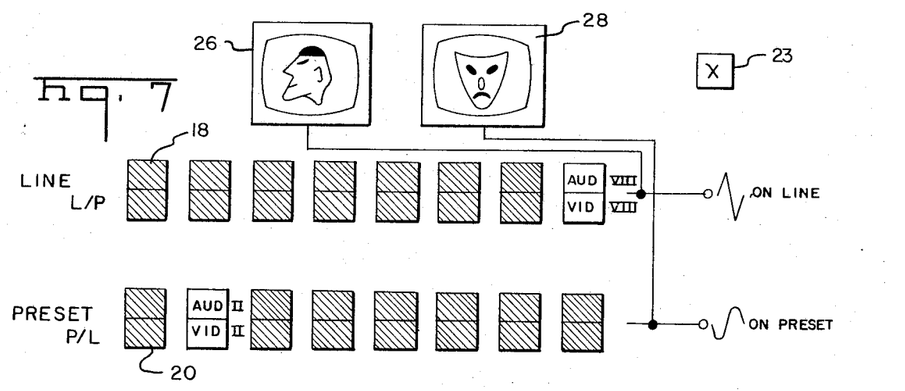

Assume now that the operator desires to go to yet another set of audio and video sources to thus program the next event. If these sources are associated with the column of pushbuttons Audio VIII-Video VIII the operator merely depresses the related pushbutton in the Preset row which causes the memory element and switch modules of that column to be operated and which causes the lamps associated with such pushbuttons to illuminate the legends thereon. In accordance with the invention, this same operation is made to clear out the previously set and closed components which were in the column Audio I-Video I to thus extinguish the lamps associated therewith in the Preset row (transferred there by operation of the Take bar). FIGURE 6 shows the resulting visual presentation. At the proper time a further depression of the Take bar 22 will then cause the relays 23 and 25 to again operate the transfer switches to reverse the output buses, putting what was formerly on Line on Preset and putting the newly selected signal sources associated with the column Audio VIII-Video VIII on the Line output bus. Again, the lamps associated with the Audio VIII-Video VIII legends in the Preset row will be extinguished and the lamps associated with these legends in the Line row will be illuminated. The lamps of the Audio II-Video II button in the Line row will be extinguished and the lamps of the Audio II-Video II button in the Preset row will be illuminated to thus indicate which of the signal sources have been selected. The monitors will again present to the operator the video and audio signals of exactly which channels are on Line and which channels are Preset. FIGURE 7 shows the resulting visual indication of Line and Preset program events.

Figure 8:
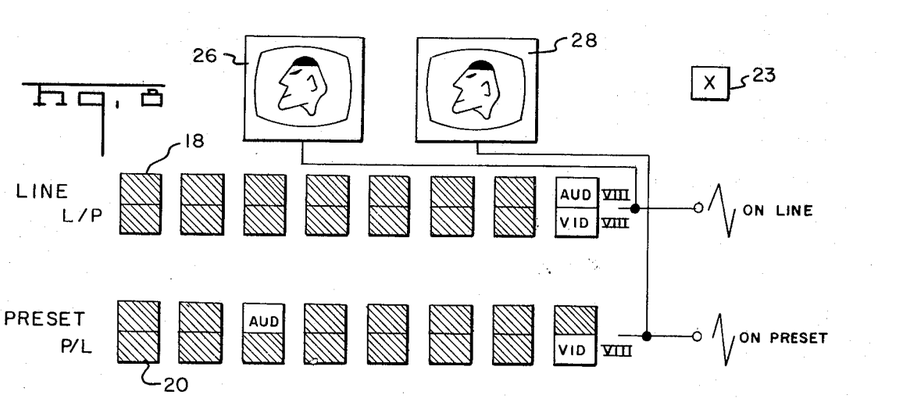

In the event that either video or audio, but not both, is to be programmed, depression of the pushbuttons 24 or 27 will selectively disconnect the drivers connected with the video or audio matrix control circuits. In accordance with the invention the lack of drive to either of the video or audio matrix control at the time of initiation of a command will prevent the memory elements associated therewith from being set or cleared and will cause the lamps associated with that part of the legend not then being utilized to remain extinguished. Assuming that the next event (after that of FIGURE 7) calls for a different audio input with the video remaining the same, depression of the Video-Only pushbutton 24 and the Preset Audio VIII-Video VIII button will result in only a video command to the P/L row. The memory element and switch module for Video-Only will be set, the audio element in column VIII of the P/L row remaining cleared. Next, if the Audio-Only and the Preset Audio III-Video III buttons are depressed, Audio-Only will be selected for column VII, the video element for such column remaining cleared in the P/L row. The resulting visual presentation is shown in FIGURE 8. If the Take bar is now depressed to reverse the state of relays 23 and 25 to $\overline{X}$ and $\overline{Y}$ the events on Preset will be transferred up to the Line in the manner heretofore described and shown. As can be appreciated, the system of the invention readily permits split audio-video programming.

DETAILED DESCRIPTION OF THE SYSTEM

Figure 9:
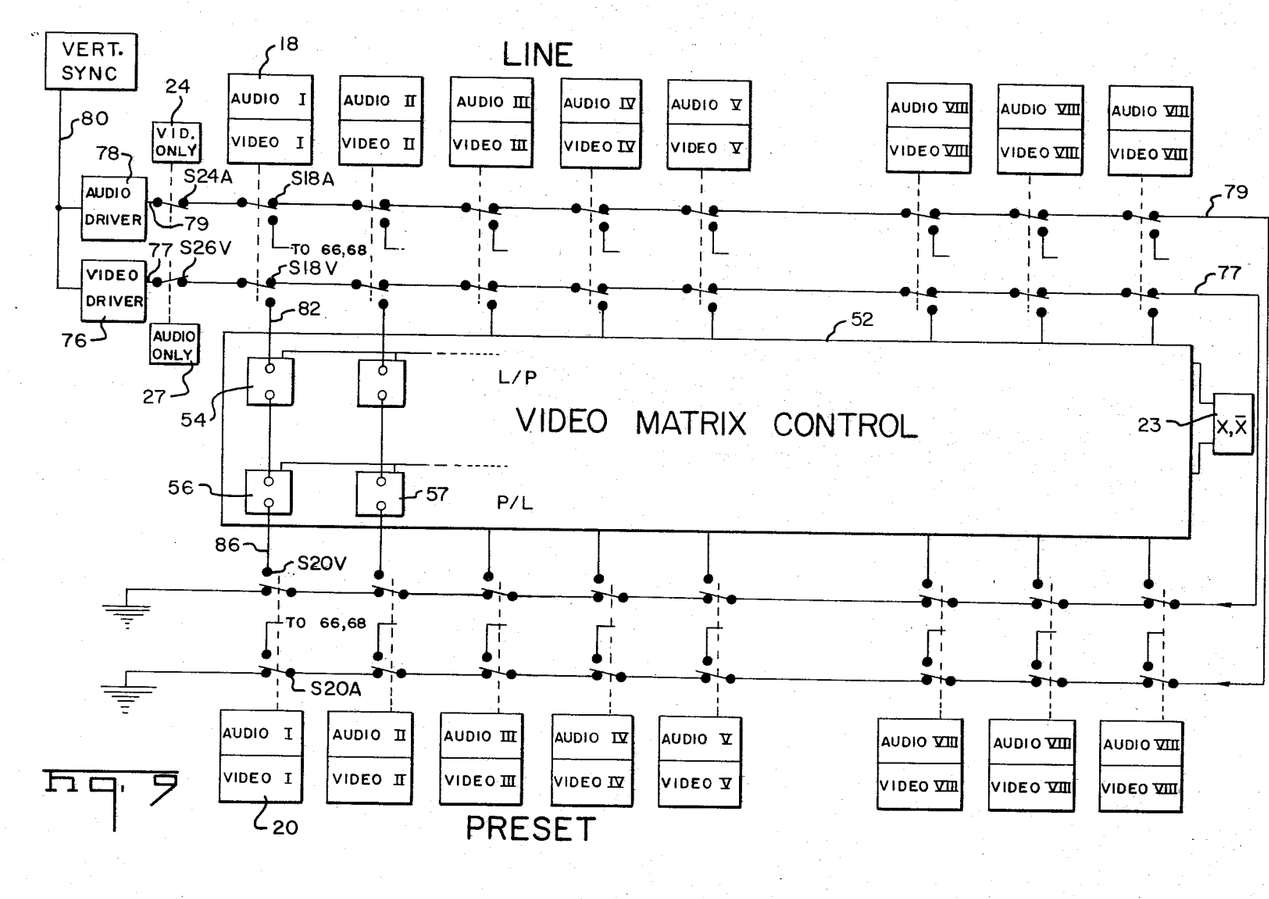
FIGURE 9 is a schematic diagram including a circuit and arrangement of control elements which permits selection of Line and Preset signal sources for audio and video under the control of the same initiating members.

With the functional operation of the system now in mind reference is made to FIGURE 9, which again shows the Line and Preset pushbuttons, the video and audio drivers, the pushbuttons for selecting video or audio, the video matrix control units 52 and the associated relay or logic 23, which effects the X and $\overline{X}$ functions responsive to operation of the Take bar. The audio matrix control, as well as the video and audio matrices are left out, but may be visualized in their proper relationship in their circuit from the description given relative to FIGURE 2. The circuit of FIGURE 9 is restricted to the system function which sets the various memory elements and shows a preferred technique and circuit for doing this. As indicated, the video and audio drivers 76 and 78 are supplied with clock or synchronizing pulses from a lead 80 connected to the vertical synchronizing generator for a video system. Each time a synchronizing pulse arrives the drivers are energized to produce an output pulse on the respective leads 77 and 79, which are connected to video and audio lines having therein a series of switches. These drivers may be any suitable device for producing pulses of the type required, but are preferably like those taught in U.S. application S.N. 378,652 filed June 29, 1964, in the name of Dormer et al. The Video-Only and Audio-Only controls are shown relative to switches S24A and S26V in these lines for the video and the audio control paths. When one of the buttons is depressed it opens its normally closed associated switch to prevent the pulses being supplied from the associated driver from being supplied to the line, 77 or 79. This in turn prevents operation of any of the pushbuttons from causing the associated memory elements and switch modules to be set and closed. Thus, when the pushbutton Audio-Only is depressed, S26V will be opened and all of the various switches shown connected to the lead 77 will be prevented from supplying setting pulses to the various memory elements in the video matrix control unit 52. Operation of the pushbuttons in the Line and Preset rows will then be limited to an audio function. In a similar manner depression of "Video-Only" pushbutton 24 will open the audio setting pulse path 79 to effectively disable all of the switches associated with the Line and Preset pushbutton controls for the audio path. If the buttons 24 and 27 are not depressed, all of the switches audio and video, are enabled to be operated by the Line and Preset buttons as heretofore mentioned.

Assume that this is the case and that the pushbutton marked Audio I-Video I is depressed. Its depression will temporarily close the switches S18A and S18V. The clock pulse rate from the drivers is made sufficiently high so that only a temporary closure of the switch is sufficient to impulse the lower lead 82 (and a similar lead in the audio matrix control unit) associated therewith. The pulses will then be routed from the switch S18A over the lower lead to elements 66 and 68 in the audio matrix control unit 64, as shown in FIGURE 2. The pulses from 76 will be routed via S18V to the elements 54 and 56, as shown in FIGURE 2 and in FIGURE 9. In accordance with the invention, one or the other of the memory elements 66 or 68 in the audio matrix control unit 64 and one or the other memory elements 54 or 56 in the video matrix control unit 52 will be set depending upon the state of the relays 23 and 25. If the relays are in the X position, the upper elements 54 and 66 will be set. If the relays are in the $\overline{X}$ and $\overline{Y}$ positions, the lower elements 56 and 68 will be set. The selected setting of memory elements will, as heretofore mentioned, in accordance with the invention, close the switch modules associated therewith to connect the signal sources associated therewith to the leads 36″ and 42″ or 38″ and 40″ which go to the monitoring and transmission equipment. By means not shown in FIGURE 9, but to be described hereinafter, the setting of a given memory element in a given column is made to automatically clear out the other memory elements not being set in the row associated with the particular memory element being set. The elements in the opposite row are left undisturbed.

Following this further and assuming that the button marked Audio-Video II is depressed in the Preset row, the switches associated therewith for audio and video will be temporarily closed to supply the memory elements in that column with set pulses. If the relays 23 and 25 are in the same state; namely, the X and Y states, the lower memory elements including 57 and 69 will be set with the remaining elements in that same row being cleared and the elements in that same column being left undisturbed; namely, the elements above elements 57 and 69. This will, of course, not affect the previously set elements 54 and 66, and the system will then be operative to provide L/P and P/L signal outputs to the transmission equipment and to the monitors 26, 28, 32 and 34. If it is then desirable to effect a transition, a single depression of the Take bar 22 will cause a reversal in the transfer switches 39 and 43 to place the L/P signal on Preset and the P/L signal on Line. Continued programming may be effected by merely depressing a selected pushbutton in the Preset row and operating the Take bar to place such up on Line. In an emergency, with the system of the invention, an alternative Line button and source may be used directly without preview or Preset. It will be noted that the circuit for controlling the setting of the various memory elements is quite simple and that audio and video functions have been combined in a single pushbutton for all Line functions and in a single pushbutton for all Preset functions. It will also be noted that once the pushbutton has been depressed and the associated memory element set, the drive supply may be disconnected without affecting subsequent operation.

Figure 10:
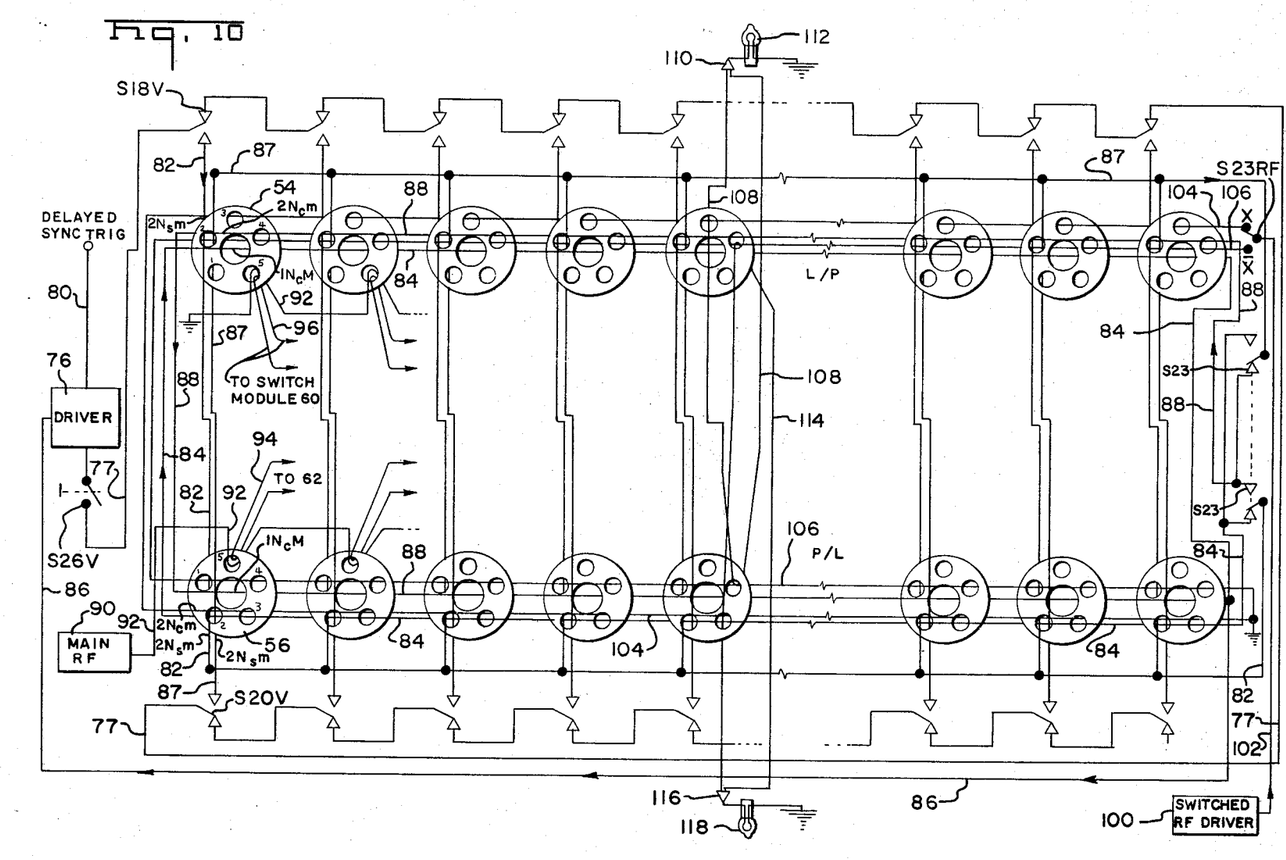
FIGURE 10 is a detailed circuit diagram of a specific embodiment of memory elements made up of multiperture magnetic cores, including wiring necessary to achieve the logic for providing the various functions of the system of the invention.

Turning now to FIGURE 10, a specific embodiment of the circuit of FIGURE 9, including multiaperture cores as the memory elements, will now be described. A comparison between FIGURES 9 and 10 will show portions of the circuit heretofore described, including the video switches S18V and S20V for the Line and Preset rows. From these switches leads are extended to the memory elements of a given column to thread each of the cores of both L/P and P/L rows in a distinctive pattern. For the purpose of describing this circuit the cores shown as 54 and 56 for the column associated with the Audio I-Video I column have been given five minor apertures numbered 1–5. In the present application the minor apertures 1 are not employed, but may be considered to be available for additional functions. The apertures 2–5 are employed and are wound with various turns to provide the functions of set and clear as well as to receive RF drive and provide readout or output.

Figure 11:
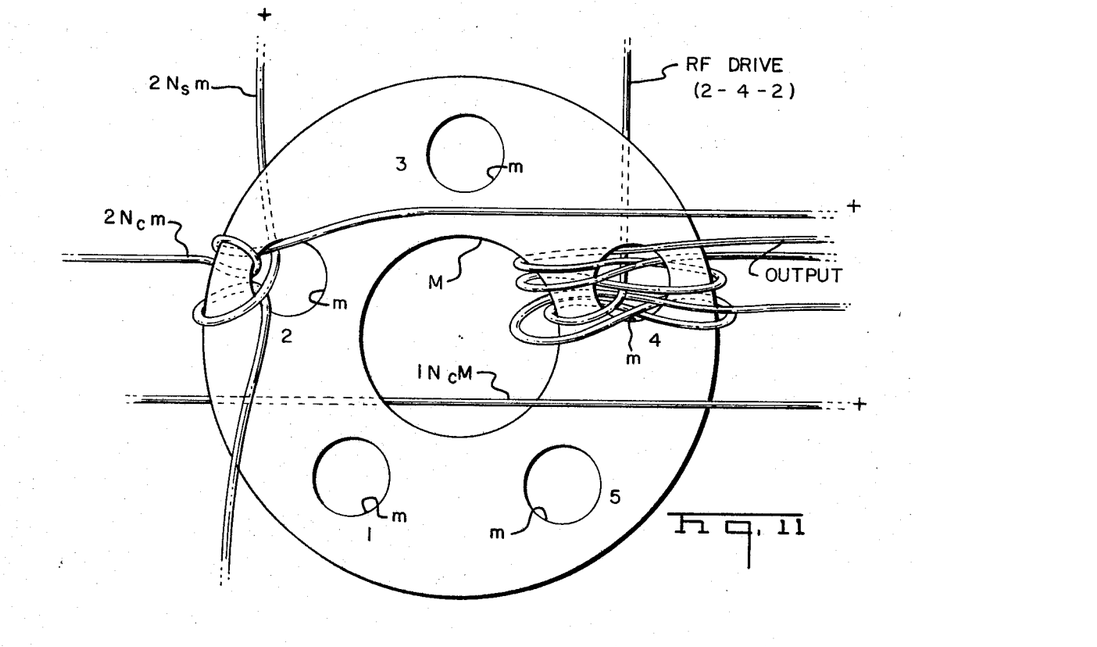
FIGURE 11 is an enlarged view of a multiaperture core showing in detail the windings thereon as employed in FIGURE 4.

FIGURE 11 shows a core enlarged many times, having windings therein in a preferred manner to accomplish these various functions. The core major aperture is labeled M and the core minor apertures are labeled $m$. The turns are labeled N with the setting or clearing function denominated by a subscript S or C, respectively. The number of turns are given as prefixes to the turn label. Thus, $2N_Sm$, as shown in FIGURE 11, indicates two turns of setting MMF applied to a minor aperture. The label $2M_CM$ means two turns of clearing MMF applied to a minor aperture and $1N_CM$ means one turn of clearing MMF applied to the major aperture. The RF drive windings are all the same and are in a preferred embodiment of a figure 8 configuration passing through the major, the minor and the outside leg of the core, as shown in FIGURE 11. The output windings are also all the same and are of a figure 8 configuration with respect to the core major, minor and outer legs. The cores are of square loop ferrite material and the particular windings shown enable the cores to be set or cleared and to be nondestructively sampled with respect to the set or clear state by the RF and output windings. Reference is made to copending U.S. applications Ser. No. 249,465 filed Jan. 4, 1963, and Ser. No. 249,466, filed Jan. 4, 1963, in the name of Mallinson et al., for a more complete description of the preferred R.F. Drive and readout technique.

Turning now to the set drive circuit of FIGURE 10, a lead 82 is made to first pass through the cores 54 and 56 in series with turns $2N_Sm$ supplied to the minor apertures labeled 2 of each core. The lead is then made to continue across the array of cores to the relay 23, shown to the right of the sketch and to the lower movable contact arm of S23 shown. The relay 23 is shown in FIGURE 10 to be in the X position or state. The lower arm S23 associated with lead 82 is in the down position to contact a lead 84, which passes through each of the cores in the lower or P/L row of cores applying thereto turns $2N_Cm$ through the apertures numbered 2. Lead 84 then is carried up to the L/P row of cores and is made to thread each of the cores of such row through winding turns $1N_CM$. The lead 84 then returns to the driver 76 via a lead 86.

The circuit just described operates as follows. When switch S18V is closed the turns linking core 54 apply a net MMF which will set such core, the turns $2N_Sm$ being sufficient to override the counteracting MMF from turns $1N_CM$. The turns linking core 56 from the same lead produce a net MMF which will not set the core 56, the turns $2N_Cm$ operating to completely cancel the effect from the turns $2N_Sm$. Each of the cores in the P/L row will thus be unaltered with respect to the set or clear state by the closure of switch S18V. Each of the cores in the L/P row, other than core 54, will be cleared due to the turns $1N_CM$. In this way, with the relay 23 in the X position depression of the Audio I-Video I button will operate to set the associated memory element in the L/P row clearing the remaining memory elements in the same row and not disturbing the elements in the opposite or P/L row. As will be observed, each of the windings for the remaining columns are identical to the windings just described, all joining 82 and the same circuit as just described. Depression of any of the other pushbuttons in the Line row will therefore work in the same way to set the core associated with the column of the particular pushbutton, clearing all of the other memory elements in the same row.

If the relay 23 were in the $\overline{X}$ position with the contact arms of S23 disposed upwardly in FIGURE 10, the following operation would occur. Assuming that S18V is closed, 82 will be energized to again apply an MMF resulting from $2N_Sm$ to both cores 54 and 56. This pulse will, however, be transferred to lead 88, in the relay 23 by the upper contact. Lead 88 passes through the minor apertures numbered 2 of each of the cores in the L/P row, applying thereto turns $2N_Cm$ and then passes through the major apertures of the cores of the P/L row with turns $1N_CM$ and returns to the driver 76 via lead 86. The net MMF operating on the cores will then be such as to set the core 56, clearing all of the other cores in the P/L row and leaving the cores in the L/P row undisturbed.

in this way the pushbutton in the Line row associated with Audio I-Video I may be made to set either of the memory elements in the associated column, depending upon the position of the relay 23 in its X or $\bar{X}$ states.

The pushbutton in the Preset row labeled Audio-Video I will operate in a similar manner to apply MMF's to the cores 56 and 54 and to the remaining cores to achieve an identical function; namely, selectively setting either of such cores and clearing all of the cores in the same row of cores. The winding for this is shown as 87 for column 1 and it passes through the apertures numbered 2 of the cores 54 and 56, applying set turns $2N_Sm$, then passes through the contact set of relay 23 to the lead 88, which returns through all of the minor apertures numbered 2 of the L/P row applying turns $2N_Cm$ and then through all of the cores of the P/L row applying turns $1N_CM$ to return to the driver 76 via lead 86. These same windings have, of course, been discussed relative to operation of the Line row of pushbuttons and no further description is deemed to be necessary.

It should be apparent how a selected core or memory element in a given row may be set by depression of either a Line or Preset pushbutton and how, in accordance with the invention, all of the cores or memory elements of the row containing the set core are cleared.

Turning now to a further aspect of the invention, there is also shown in FIGURE 10, an element 90 labeled MAIN RF. This element is the main nondestructive readout RF driver for the video matrix control unit. Its output shown on lead 92 links each of the cores of the L/P and P/L rows in series applying thereto RF drive MMF in the manner described with respect to FIGURE 11. The minor aperture is shown as that numbered 5. A description of a preferred embodiment of RF driver is disclosed in copending U.S. application S.N. 249,465 mentioned above. Through the same aperture numbered 5 threaded by the RF drive windings from lead 92 is an output circuit shown as 94 with respect to core 56 and 96 with respect to the core of 54. This output circuit is preferably a figure 8 configuration like that shown in FIGURE 5. Each of the output windings from each of the cores leads to a separate switch module and is operable when energized to cause such switch module to connect the source associated therewith to the related bus. Thus the output 94 leads to switch module 62 in the video matrix and is operable to cause such switch module to interconnect its source to the lead 36". The output on 96 goes to the switch module 50 and is operable to cause such switch module to connect the source associated therewith to the output bus labeled 38". In accordance with the invention when there is no signal voltage on a given output lead from the cores, the switch modules are caused to operate to disconnect their associated sources from the buses. As mentioned in copending application Ser. No. 537,090 to Dowling et al., filed Mar. 24, 1966, it is preferred that there be a delay in the disconnect operation of a given switch module to provide overlap switching. This may be accomplished as taught in S.N. 537,090 or in a number of other ways.

From the foregoing it will be apparent that the MAIN RF drive is applied to all the cores of the matrix, all of the time. Thus, when any core is set its associated switch module is caused to close, and when any core is cleared its associated switch module is caused to open. In addition to the MAIN RF just described, there is provided a switched RF from a driver 100, as shown in FIGURE 10, which may be identical to the driver 90 in construction. Driver 100 is operated to supply RF drive via lead 102 to the contacts S23 RF in relay 23. These contacts supply separate leads 104 and 106 associated with the X and $\bar{X}$ functions of the relay, respectively. When the relay is in the X position lead 104 is driven with RF from 100 and when it is in the $\bar{X}$ position, lead 106 is driven from 100. These leads are made to thread all of the cores of the control unit in series in the manner shown. One of the leads is made to thread the minor aperture numbered 3 of each of the cores of the L/P row and of the P/L row and the other lead is made to thread another minor aperture of each of the cores of both rows, which is as shown the aperture numbered 4. The drive windings supplied by leads 104 and 106 are preferably again of a figure 8 configuration as in the scheme discussed relative to FIGURE 11. The output windings associated with each core are shown in the column associated with lamps in or under the pushbuttons labeled Audio-Video V. Similar output windings similarly link the cores of a given column with the pushbuttons of the same column in the remaining columns, but are left off the remaining cores for clarity. There is then provided an output winding for each column linking both cores of such column to a lamp which is positioned beneath the pushbutton in the Line row of pushbuttons and a similar circuit supplying a lamp beneath the pushbutton in the Preset row. These windings are made to thread different minor apertures in the L/P and P/L rows. The windings labeled 108 thus thread the aperture numbered 3 of the core in the L/P row and the aperture numbered 4 of the core in the P/L row. The windings threading the minor apertures are of the preferred configuration as discussed with respect to FIGURE 11. The windings 108 lead to an amplifier 110 which drives a lamp 112. Both L/P and P/L cores are threaded by 108 through minor apertures 3 and 4, respectively. Windings 114 link the aperture 3 in the P/L row and aperture 4 of the L/P row and feed amplifier 116 and lamp 118. These windings permit the function described above with respect to FIGURES 3–8. If either of the cores in the L/P or P/L rows in the column Audio V-Video V are set, either of the lamps 112 or 118 may be lighted, depending upon the position of relay 23 in the X or $\bar{X}$ positions. If the relay is in the X position the apertures numbered 3 of each core will be driven by RF to cause the winding 108 to be driven to cause 110 to light bulb 114. If, on the other hand, the relay is in the $\bar{X}$ position, then the aperture numbered 4 of each core will be driven and the winding 114 will supply the amplifier 116 and light the lamp 118.

In accordance with the description heretofore given, when one of the pushbuttons Line or Preset is depressed one and only one core of the column will be set, the other core remaining cleared. From the previous description, if we assume that a core in the L/P row is set and the relay 23 is in the X position, the related lamp in the Line row will be lighted to indicate that the switch module associated with such L/P core is connected to the Line. If the Take bar is then operated to drive the relay 23 into the $\bar{X}$ position, causing the reversal heretofore mentioned in the transfer switch 39, the lamp in the Line row will be extinguished and the lamp in the same column, in the Preset row will be lighted. A further operation of the Take bar without a change in program will cause the lamp in the Line row to come back on and the lamp previously lighted to be extinguished. In this way the operator is made aware of the logic condition of the relays and in the switch matrix automatically without having to either remember which of the rows is P/L or is L/P at the time and without having to look for separate lights associated with L/P and P/L functions.

As previously mentioned, each of the pushbuttons is equipped with two lamps, such as 114 or 118, one for video control and one for audio control. These lamps are disposed beneath the legends AUDIO and VIDEO in the manner described such that if Audio-Only or Video-Only is operated only the lamp associated with the chosen function will be lighted. The windings from the audio control unit are identical in arrangement to that described with respect to FIGURE 10.

It is also contemplated that signals from the amplifier such as 110 and 116 may be used for other purposes such as to drive tally lights on "live" camera or film equipment indicating use on air.

Having now described the invention in an exemplary mode for preferred practice, it is now defined in the appended claims.

What is claimed is:

1. In a system for video and/or audio programming, switch means each connected to an input signal source and to an output lead, a memory device operable in two stable states, said memory device being operable in one state to cause a given switch to connect the associated source to said output lead and in another state to disconnect said source from said lead, selecting means operable to place a preselected memory device in said one state and simultaneously place the other memory devices in said another state whereby to place a selected source on said output lead and remove a previously selected source from said output lead.

2. The system of claim 1 wherein each memory device is a magnetic core capable of being set or cleared in a time less than the vertical blanking rate of a video receiver and said selecting means includes a driver capable of driving said memory devices to at given state in a time less than the vertical blanking rate of a video receiver.

3. The system of claim 2 wherein each core includes a nondestructive readout connection to an associated switch whereby to provide a continuous drive to said switch as long as said memory device is in said one stable state.

4. The system of claim 1 wherein said switches and said memory devices are divided into line and preset groups and there is provided an output lead for each group, an output bus and control means operable to alternately connect said output lead for each group to said bus with the said selecting means being divided into two groups for line and present selections whereby operation of said control means places a previously selected preset source on said output lead and removes the line source from said output lead.

5. The system of claim 4 wherein there is included line and preset indicating means and each said device has an output connection to drive said indicating means when said device is set and said control means is operable to switch the connection from said devices to indicate which group is line and which is preset.

6. The system of claim 4 wherein the said devices are connected to be driven from a common drive with each selecting means operating to connect said drive to given memory devices to set such memory devices and there is a further connection to the other device of the same group to clear such devices.

7. The system of claim 4 wherein each memory device is a magnetic core and the said output connection provides a nondestructive readout to a given switch.

8. The system of claim 4 wherein there is included means operable to enable said selecting means to drive certain memory devices for video and certain memory devices for audio whereby only certain of said switches are operated and certain of said sources are connected to the output lead and bus.

9. In a control system for programming events in a sequence, the combination comprising a plurality of sources of input signals and at least an output path, the presence of a given input signal on said output path comprising an event and the transition from one input signal to another input signal on said output path comprising a change in events, initiating means associated with each input signal source, a memory element associated with each initiating means and switch means for connecting each signal source to said output path associated with each memory element, drive means operable to set or clear said memory elements, said drive means being responsive to operation of a preselected initiating means to set a given memory element and clear all other memory elements, said memory elements upon being set operating to connect a given input signal source to said output path and upon being cleared operating to disconnect the associated input signal source from said output path whereby a sequence of events may be programmed on said output path by the sequential operation of said initiating means.

10. The system of claim 9 wherein the said memory elements are connected to said drive means in series in a sense to clear all of said elements except the selected one element by a common drive signal and with an individual connection to said drive means in a sense to set the selected memory element by the same signal, said individual connections being operable to override the said clearing signal to the selected memory element whereby the selected element is set and the remaining elements are cleared by the same signal.

11. In a control system for programming events in a sequence, the combination comprising a first plurality of sources of input signals of one type and a second plurality of sources of input signals of another type, an input path for each input signal and first and second output buses for the first and second types of signals, the connection of a given input signal from either or both of said types of signals to the respective output buses comprising an event and a transition from one given input signal to another input signal on the respective outputs buses comprising a change in events, a memory element associated with each source of input signals and a switch associated with each memory element and operable to connect or disconnect an input signal to the related output bus, initiating means operable to set one or the other of a pair of memory elements, one for each of the plurality of sources of different types whereby operation of a given initiating means is made to close a given switch to its associated output bus to define an event and operation of different initiating means in a sequence serves to provide a program of events.

12. The system of claim 11 wherein each of said memory elements is supplied by a common drive adapted to set a selected memory element and to clear the remaining memory elements associated with the plurality of elements of a similar type.

13. The system of claim 12 wherein each of the memory elements of the first plurality of elements is driven by one driver and each of the memory elements of the second plurality of memory elements is driven by a different driver and there is provided to each driver a common source of synchronizing pulses whereby the operation of the initiating means for each plurality of elements and for each plurality of switches is synchronized.

14. In a control system for controlling a switch matrix having a plurality of distinct inputs and at least one output, a switch module for each input operable to connect or disconnect an input to said output, a bistable state memory element for each module operable in a set state to drive a module to connect its input to the output and operable in a clear state to drive a module to disconnect its input from said output, the said elements having a common drive with drive supply means individual to each element to selectively drive said element to a set state and a circuit connection in series with all other elements to drive said other elements to a clear state.

15. The system of claim 14 wherein said memory elements are multiaperture cores having a nondestructive readout circuit to supply drive to said switches in the absence of drive supply as long as said cores are set.

16. In a control system for programming events in a sequence, the combination comprising in circuit at least two rows of sources of inputs with pairs of sources forming columns of sources, at least one output with the presence of an input from either of said rows constituting an event and a transition from a given input of one row to a given input of the other row, constituting a change in events, a control element operable to drive a signal switch for each input to connect or disconnect an input to said output, at least two rows of initiating means with pairs of initiating means associated with pairs of control elements and signal switches forming columns related to sources, further switch means for each element each operable to supply control drive to both control elements of a given column to cause signal switch closure responsive to either of the initiating means for a column, a further control means common to both rows of inputs and to all control elements and operable to alternately enable the control elements of one row and disable the elements of the other row, whereby upon operation of said further means in one state or the other, a given initiating means is enabled to operate either of the elements in a column to connect a given input to the output.

17. The system of claim 16 which includes a further output and one of said outputs is associated with one row of elements and signal switches with the further output being associated with the other row of elements and signal switches whereby operation of a given initiating means operates said elements to drive the associated signal switch to connect one input to one output or a different input to the further output, depending upon the state of said further control means.

18. The system of claim 17 wherein each of said initiating means has an associated indicating means and there is a circuit to drive indicating means from either of a pair of control elements dependent upon the position of said further control means whereby the drive to said indicating means is switched to provide an indication that there is a control element set in a given column and a switch connected in said colum to indicate which input is connected to which output.

19. The system of claim 18 wherein the said control elements are capable of being set or cleared and there is means to drive said elements to a set or clear state responsive to operation of an initiating means and said indicating means are connected in a circuit to be driven if a control element is set and to be not driven if a control element is cleared.

20. A logic control system for a switch matrix including rows of switches having inputs with each row of switches connected to a different output, rows of control elements each connected to a switch and operable to drive said switch to connect or disconnect said input to the output of a said row of switches, rows of initiating means with each initiating means being operable to actuate one or the other of a pair of said control elements in a column of elements and associated switches to cause the associated switch to connect its input to an output, circuit means connected to said elements and operated by a selected initiating means to cause a selected one of said pair of said elements to drive the said switch means to closure and the other of said elements in the same row to drive the associated switch means to open whereby one and only one input in each row of switches can be connected to an output at a time responsive to successive operation of initiating means in said rows.

21. The system of claim 20 wherein there is included a further control switch connected to both outputs and to two output buses, the said further switch being operable to reverse the connections of said inputs to said output buses to change the signal output from said rows without operating said control elements or associated switches.

22. The system of claim 21 wherein there is included an indicating means associated with each initiating means and driven by said further control switch through the said elements to indicate the connection of a given input to an output bus in a column associated with said initiating means.

23. In a system wherein signal programming is effected, a circuit for providing an indication of the events programmed including initiating means to select different input signals and switch means including a two-state device responsive to said initiating means to switch input signals onto one or the other of two output paths, an indicating means proximate to each initiating means and arranged to be driven by either of a pair of said two-state devices each associated with one signal source and one output path, control means operable to switch said output paths onto one or the other of two output buses, said control means including a circuit connection and means to drive said two-state elements to supply the indicating means associated with a selected input signal and a selected output bus whereby to provide a continuous indication of the state of connections in said system.

24. The system of claim 23 wherein there is provided one set of initiating means and a duplicate circuit of switch means, input sources, output paths, output buses and control means, the said duplicate circuit being for a different type of signal, the said indicating means being duplicated for said circuit and positioned proximate to the set of initiating means whereby operation of said control circuit provides a continuous indication of the state of connections in said system for both circuits.

25. In a system for programming events wherein each event is the presence of a given input signal on an output bus, a circuit including at least two output paths and an output bus with control means to connect one or the other of said paths to said bus, a plurality of input signal sources and a like plurality of pairs of memory elements capable of being driven into distinct set or clear states and each associated with a switch which is responsive to the state of an element to connect or disconnect a given input source to a given output path, a pair of initiating means for each pair of elements, said initiating means being operable to set either of the associated pair of elements responsive to said control means whereby operation of either of the pair of initiating means is made to connect one or the other of the signal sources associated therewith to an output path and to the output bus dependent upon operation of said control means.

26. In a system for programming events wherein each event is the presence of a given input signal on an output bus, a circuit including at least two output paths and an output bus with control means to connect one or the other of said paths to said bus, a plurality of input sources and a like plurality of pairs of memory elements capable of being driven into distinct set or clear states and each associated with a switch which is responsive to the state of an element to connect or disconnect a given input source to a given output path, a pair of initiating means for each pair of elements, said initiating means being operable to set either of the associated pair of elements responsive to said control means, indicating means driven by each pair of memory elements so as to provide an indication of the set state of either of said pair of elements, said control means being operable to drive one or the other of said elements in said pairs to provide an indication of which output path is connected to said output bus and which input signal source is connected to the connected output path.

27. The system of claim 26 wherein there is a further output bus and said control means is operable to connect one path to one bus and the other path to the further bus, said indicating means including means to provide an indication of the set state of each element in different pairs of elements, said control means operating to switch said path in connection to said buses and including further means to drive one element in each of the different pairs of elements whereby to provide an indication of which signal sources is connected to which output bus.

28. In a system for programming events wherein each event is the presence of a given signal on an output bus, a circuit including a plurality of input signals and at least two output paths, a memory element and a switch for each input signal, the memory element being operable in a first state to actuate its associated switch to connect the associated input signal to one output path and operable in a second state to actuate its associated switch to disconnect the associated signal from said one output path, initiating means for each element operable to drive said elements into the first and second states, indicating means for each initiating means and drive means to sample said elements to drive said indicating means to indicate the state of the said elements, control means to connect one or the other of said paths to the said bus to provide an output, the said control means including means to connect said drive means to cause said drive means to be switched to the indicating means associated with the element and path then connected to the output bus whereby to provide a continuous sample of the connection in said system.

29. In a control system for broadcast programming wherein each programming event is represented by the presence of a selected signal on an output bus leading to transmission equipment, at least first and second rows of input sources, a switch matrix including at least first and second rows of switches each associated with a given input source and operable to connect or disconnect the associated source to an output lead associated with the row of said switch, a memory element for each switch with said memory element being operable upon being set to cause said switch to connect its associated input source to the associated output lead and operable upon being cleared to cause said switch to disconnect its associated source from its associated output lead, drive means to drive said elements to set and cleared states, initiating means in line and preset rows each operable to supply said drive to a memory element associated with at least one switch in each of said rows, a circuit connection therewith operable to cause said drive to set one and only one of the memory elements of the pair of elements associated therewith and control means operable to enable said drive means to supply drive to one or the other rows of said elements to be set by a given initiating means and to connect one of the output leads to the output bus whereby dependent upon the operation of said control means the different rows of switches of cores may be made to serve line or preset functions.

30. The system of claim 29 wherein indicating means are included to indicate the operation of a given initiating means.

31. The system of claim 29 wherein said indicating means are connected to be driven by said memory element.

32. The system of claim 30 wherein there is included means to switch the drive to said indicating means responsive to operation of said control means whereby the initiating means in line and preset rows are identified in accordance with the row of switches having an input source connected to an output lead and to an output bus.

33. In a system for broadcast programming, first circuit means for selecting audio signals and second circuit means for selecting video signals, each circuit means including at least a pair of rows of switches, each row of a pair being connected in said circuit to be alternately operated for providing a line output and a preset output from one of said switches in a row, each switch in a row being connected to connect or disconnect a given signal input to an output path associated with a given row, a memory element for each switch operable when set to drive said switch to connect the input source associated therewith to an output path and operable when cleared to cause said switch to disconnect said input source to the said output path, a drive circuit operable to set said memory elements, initiating means common to both audio and video circuit means, said initiating means being operable to selectively connect one of said elements in each row to said drive to set said element and cause the operation of the associated switch, control means operable to switch said drive whereby a given initiating means is enabled to set one or the other of the associated elements, said control means further including means to switch the output paths of said rows to an output bus connected to transmission equipment whereby to permit alternate selections of input sources to be put onto said output bus after the operation of a given memory element and associated switch to connect a selected input to the output path of the row.

34. In a system of claim 33 wherein there is included an additional output lead connected to one of the output paths and there is provided monitoring equipment for line and preset functions connected to said additional output leads whereby to provide a presentation of the line signals and preset signals selected by said system.

35. The system of claim 34 wherein there is further included line and preset rows of the indicating means, one for each initiating means, the said indicating means being connected in a circuit to be driven by the said memory elements of both rows of memory elements and the said control means being operable to enable the memory elements of one row or the other row for each pair of rows to drive either of the rows of indicating means depending upon the position of said control means whereby to provide a visual indication of the selected initiating means and input at the point of initiation of said selection and a visual indication of the operation of said control means.

References Cited

UNITED STATES PATENTS

| | | | |
|---|---|---|---|
| 2,969,427 | 1/1961 | See | 178—6 XR |
| 3,174,135 | 3/1965 | Dreyer et al. | 340—166 XR |
| 3,268,866 | 8/1966 | Van't Slot et al. | 340—147 |

DONALD J. YUSKO, Primary Examiner

U.S. Cl. X.R.

178—6